E. BOONE.
MACHINE FOR MAKING HEELS ON HORSESHOE BLANKS.
APPLICATION FILED DEC. 22, 1920.

Patented June 20, 1922.
6 SHEETS—SHEET 4.

Inventor
ENOCH BOONE.
By his Attorneys

E. BOONE.
MACHINE FOR MAKING HEELS ON HORSESHOE BLANKS.
APPLICATION FILED DEC. 22, 1920.

1,420,517.

Patented June 20, 1922.
6 SHEETS—SHEET 5.

Inventor
ENOCH BOONE.
By his Attorneys

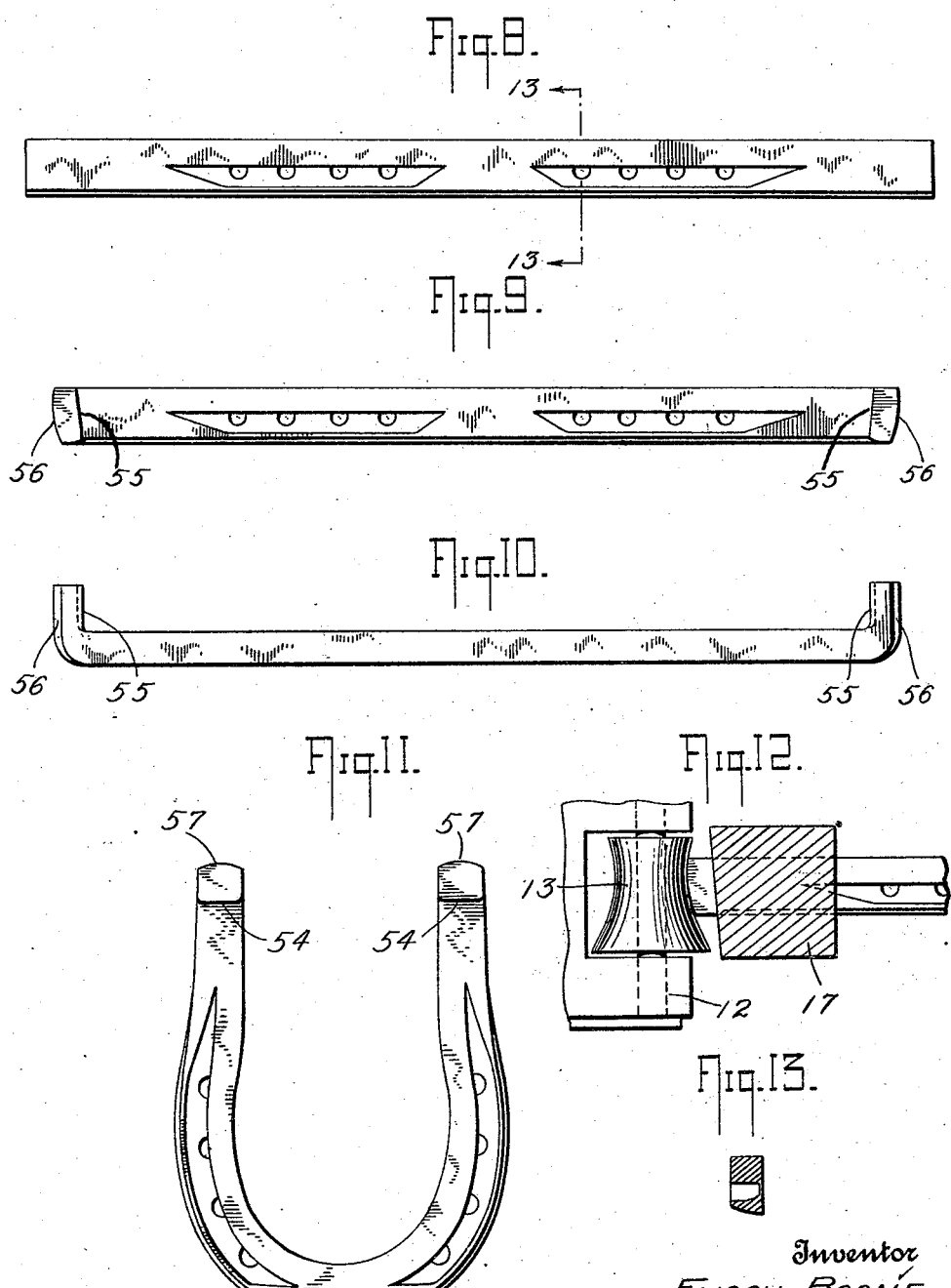

UNITED STATES PATENT OFFICE.

ENOCH BOONE, OF POUGHKEEPSIE, NEW YORK, ASSIGNOR TO PHOENIX HORSE SHOE COMPANY, OF POUGHKEEPSIE, NEW YORK, A CORPORATION OF ILLINOIS.

MACHINE FOR MAKING HEELS ON HORSESHOE BLANKS.

1,420,517.　　　　　　Specification of Letters Patent.　　Patented June 20, 1922.

Application filed December 22, 1920. Serial No. 432,390.

*To all whom it may concern:*

Be it known that I, ENOCH BOONE, a citizen of the United States, residing at Poughkeepsie, county of Dutchess, New York, have invented a certain new and useful Improvement in Machines for Making Heels on Horseshoe Blanks, of which the following is a full, clear, and exact description.

My invention relates to a machine for forming heels on horseshoe blanks and has for its object to produce a machine for forming heels upon horseshoe blanks so that the heeled blanks can afterward be bent into horseshoe shape. It further has for its object to provide means so that the heels may be formed and the shoes bent during a single heat. It further has for its object to so form the heels that when the shoe is shaped the front faces of the heels will be at the desired angle. It further has for its object to so form the heels upon the blank that when the blank is shaped into horseshoe form upon a shaping machine, the rear faces of the heels will have the desired shape. It further has for its object new and improved clamping means for the blank which shall hold the blank in position during the heel forming stage and can easily be withdrawn after the heels have been formed. It further has for its object to provide automatic means for properly locating the blank before it is clamped. It further has for its object to provide means that by one heel can be longer than the other if desired. It further has for its object to provide means for adjusting various parts so that the same machine can be used with blanks of different lengths for shoes of different sizes.

One feature of my invention consists of the easily withdrawable clamping device. Another feature consists of bending devices acting simultaneously upon both end portions of a blank to bend up the heels. Another feature consists in a new and improved blank locating means. Another feature consists in cams acting directly upon the movable clamping member in conjunction with a spring for retracting that clamping member. Another feature consists in the lost motion connection between slides carrying the bending devices and the actuating crank shaft therefor. Another feature consists in providing the bending devices with concave bending rolls.

The following is a description of my invention, reference being had to the accompanying drawings in which:

Fig. 8 is a left-hand view of a blank ready to be inserted in the machine;

Fig. 9 is a left-hand view of a blank with heels formed thereon after it has been acted upon by the machine;

Fig. 10 is a front elevation of said blank;

Fig. 11 is a horseshoe shaped up from such a blank;

Fig. 12 is a detail showing a bending roller, completing its action upon one end of a clamped blank: and Fig. 13 is a section on the line 13, 13— Fig. 8.

Figure 1:
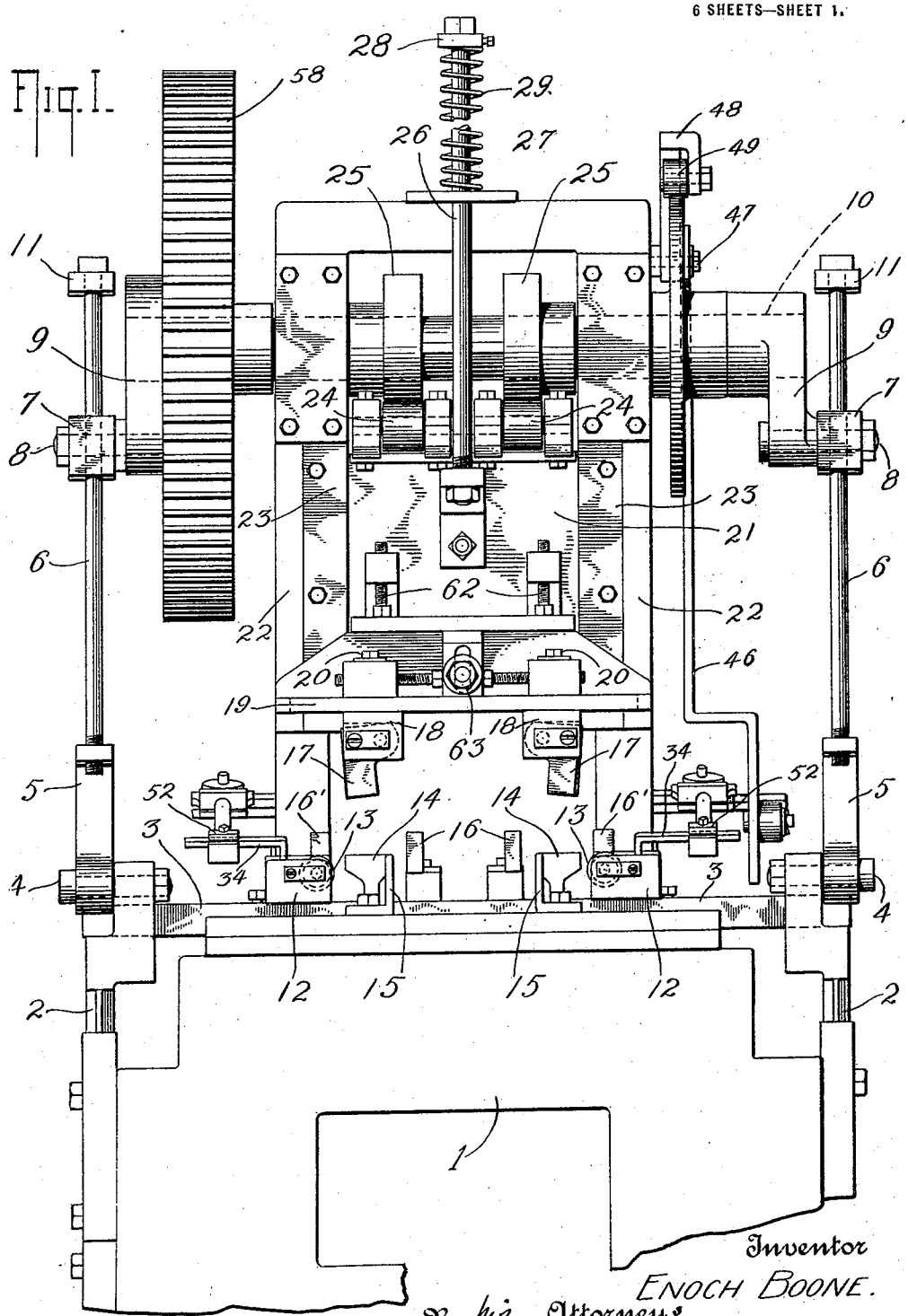
Fig. 1 is a front elevation of the machine embodying my invention when the parts are in position to receive a blank.

Referring more particularly to the drawings:

1 is the base of the machine having on its opposite ends guide-ways for slides 2, 2 which carry two bars 3 at their upper ends. These slides are pivotally connected at 4, 4 to heads 5, 5 to which are connected rods 6, 6 which slide in blocks 7, 7 pivotally connected at 8, 8 to crank arms 9, 9 on the main shaft 10. When the slides 2, 2 and the cranks 9, 9 are in their lowermost positions the blocks 7, 7 are removed for some distance from the heads 11, 11 secured to the upper ends of the rods 6, 6, so that as the crank revolves the slides 2, 2 will remain at rest when the crank arms 9, 9 are in the lower halves of their strokes, but will be raised by the crank arms 9, 9 as those crank arms pass through the first part of the upper halves of their strokes, so as to impart a quick hammer blow movement for the purpose hereinafter described—

Adjustably secured into bars 3 are two bending blocks 12, 12 carrying bending rollers 13, 13, which blocks and rollers move up and down with the slides 2, 2. These rollers are offset relatively to the bars 3, 3 so that the central portions of their faces come in line with two supports 14, 14 adjustably mounted upon the bed of the machine and forming one member of a clamp. Extending forward from these supports are guides 15, 15 which aid in the placing of a blank upon those supports. The bars 3 of the machine also carry adjustable stops 16, and the blocks 12 carry stops 16', which limit the backward movement of the blank as it is being placed in the machine. Above the supports 14, 14 are two blank-contacting members 17, 17 carried by blocks 18, 18 adjustably mounted upon a crosshead 19 and secured in a position by clamping bolts 20. This crosshead is carried by a slide 21, moving in guide-ways formed by the uprights 22 from the bed of the machine, and plates 23 secured thereto, and carries at its upper end anti-friction rollers 24 which are engaged by cams 25 rigidly mounted upon the shaft 10. The slide 21 with the members 17, 17 constitute the other member of the clamp. Connected to the slide 21 is a rod 26 which passes through a plate 27 carried by the upper ends of the uprights 22, 22 and is provided at its upper end with a head 28. Between plate 27 and head 28 is a powerful spring 29 which lifts the slide 21 when that slide is permitted to move upward and yields so as to permit the cams 25 to force the slide downward as heretofore described.

Figure 4:
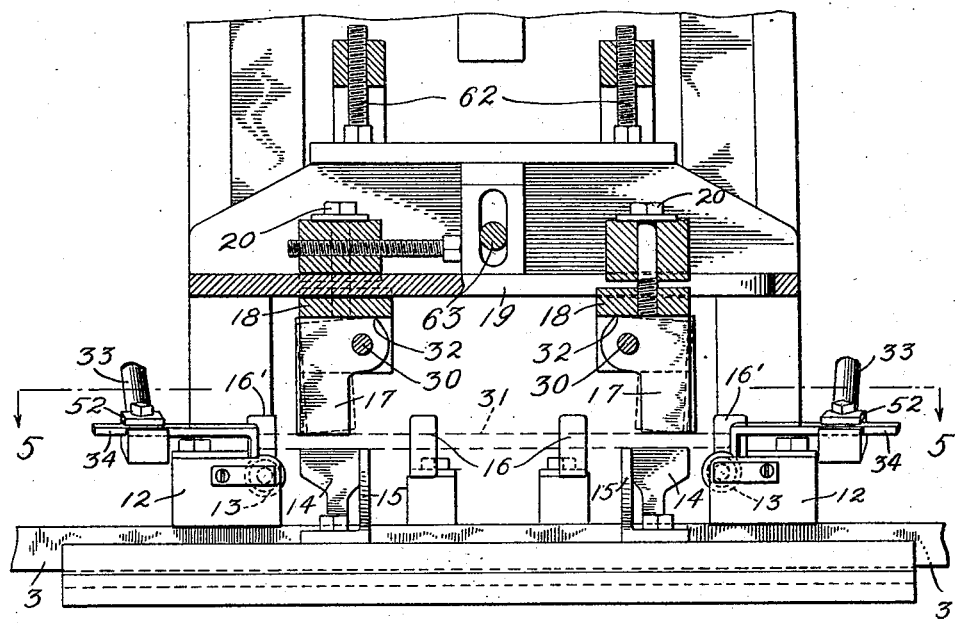
Fig. 4 is a front elevation of certain detail parts, portions being shown in section.
Figure 5:
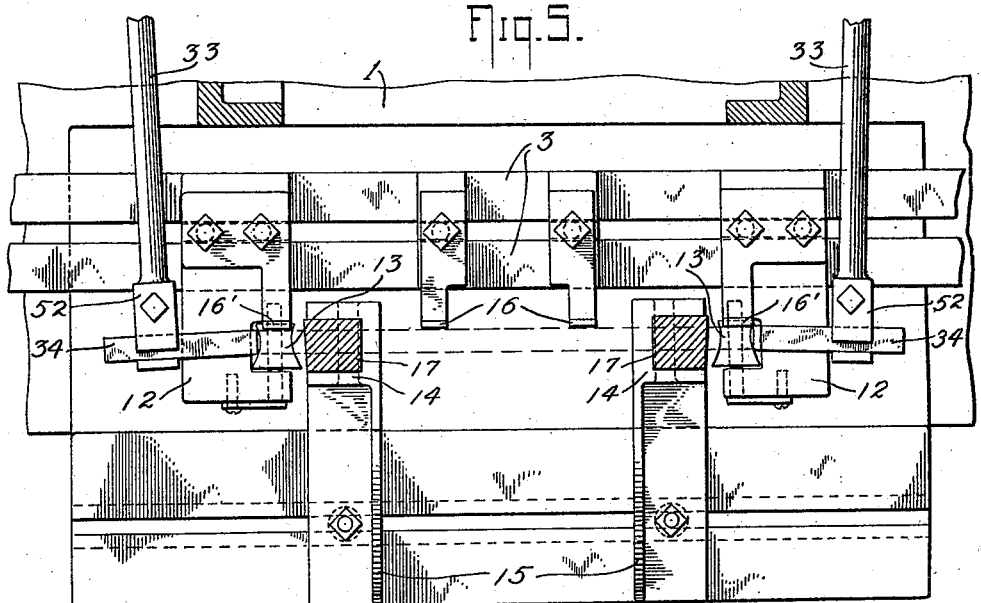
Fig. 5 is a plan view of certain parts on the line 5, 5 Fig. 4.
Figure 6:
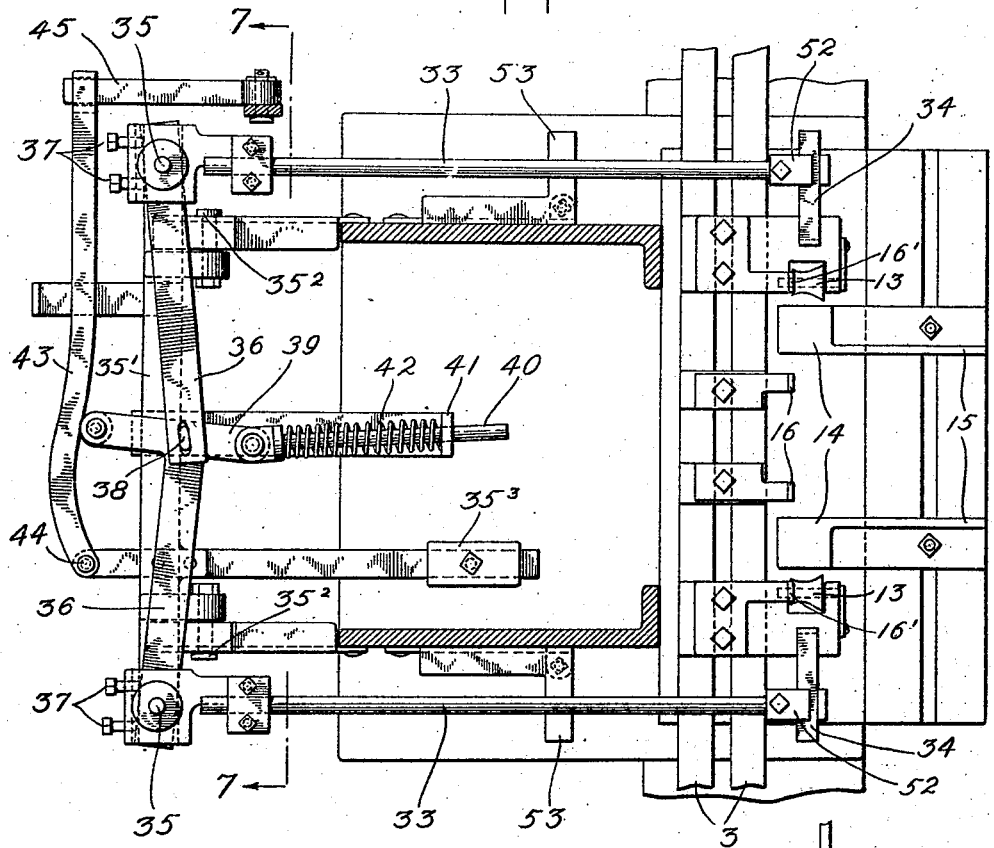
Fig. 6 is a sectional view on the line 6, 6 Fig. 3.
Figure 7:
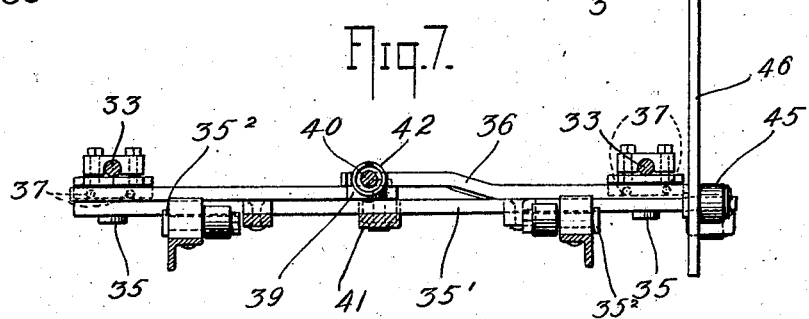
Fig. 7 is a horizontal section on the line 7, 7 Fig. 6.

The clamping members 17, 17 are L shape as shown in Fig. 4. At least one of them and preferably both are pivoted at 30 to the corresponding blocks 18 carried by the crosshead 19, so as to be movable one toward the other. The pivots are preferably on the inner sides of the centers of gravity of the members 17 so as to cause them to tilt inward as shown in Fig. 1 when lifted. On account of the arrangement of the pivots the blocks 17 when lifted tend to move inward to the position shown by dotted lines so that the outer faces are out of the vertical. They are provided with flat blank-contacting surfaces on their lower ends which are at right angles to their outer surfaces. When a blank is being subjected to the action of the machine, the members 17, 17 in their lowermost position engage the blank (shown in dotted lines at 31) and clamp it against the supports 14, 14, and inasmuch as their lower faces are at right angles to their outer faces, this engagement causes them to assume such a position that their outer faces are vertical as shown in full lines in Fig. 4. In order to prevent the members 17, 17 from swinging too far inward when lifted, they are each provided with a shoulder 32 which, by engaging a portion of the block 18, acts as a stop to limit their inward motion.

In order to properly locate the blank longitudinally upon the supports 14, 14 two swinging arms 33, 33 are provided upon the forward ends of each of which is adjustably mounted a finger 34. These arms are pivoted at 35 to a bar 35' pivoted to the frame at 35² to which is connected a counter balance 35³ and are rigidly connected to lever arms 36, whose angular relation with the arms 33 can be varied by means of the adjusting screws 37. These arms 36 are connected together by a pin and slot connection shown at 38 so that they move simultaneously. One of these arms has a crosshead 39 to which is connected a rod 40 passing through a stop 41 against which bears a compression spring 42, tending to move the head 39 together with its arm 36 and the other arm 36 to the rear. On the rear end of the crosshead is mounted an anti-friction roller against which bears a lever 43 pivoted at 44 to an abutment fixed to the bar 35'. To the free end of this lever 43 a link 45 is connected, which link is in turn connected to the lower end of the L shape lever 46, pivoted to the frame at 47 and having its upper end 48 provided with an anti-friction roller 49 which engages a heart shape cam 50 fixed on the main shaft 10.

The arms 46 and 48 are normally fixed relatively to one another and have their angular relation adjusted by means of adjusting screws 51 passing through a flange 51ᵃ overhanging the arm 48. The action of the cam 50 is such that it brings the arms 33 toward one another just prior to the descent of the contact members 17, so as to properly center the blank upon the rests 14 before they are clamped thereto.

The positions of the fingers 34 can be adjusted roughly relatively to the arms 33 by means of the clamps 52, securing them to those arms and their positions relatively to the clamping member 17, and can be adjusted with greater accuracy by means of set screws 37. This latter adjustment can be made by the adjuster when the machine is in operation.

The fingers 34 rest upon the bending blocks 12 so as to move up and down therewith about the pivots 35². In order to remove the weight of the fingers from the bending blocks when the blocks are in their lowermost position and the fingers are moving laterally, the frame is provided with supports or rests 53 adjustable vertically so as to engage the arms 33 at that time and support them during such lateral movement.

In order that when the blank is bent around into the shape of the shoe, the inner faces 54 of the heels may be at the proper angle, those faces before bending must slant from front to rear so that their rear portions are farther apart than their front portions as shown at 55 in Fig. 9. To secure this the planes of the outer faces of the contact members 17, 17 are each formed with a corresponding angle as shown in Fig. 12.

When a blank with the preformed heels thereon is bent around in the usual bending machine into the form shown in Fig. 11, there is a tendency to force metal from the outer rear corners outward so as to form a point. In order to prevent this the bending rollers 13, are made concave as shown in Fig. 12 so that their surfaces are curved axially, thus rounding the outer faces of the upturned heel portions as shown at 56 Fig. 9. When this is done and the blanks are subjected to the shaping machine, the metal flows inward instead of outward, giving the rear faces of the heels the desired conformation as shown at 57 in Fig. 11.

The main shaft is provided with a large gear 58, which in turn is driven by a small gear 59 on a counter-shaft which carries an ordinary driving pulley 60 and fly-wheel 61.

Figure 3:
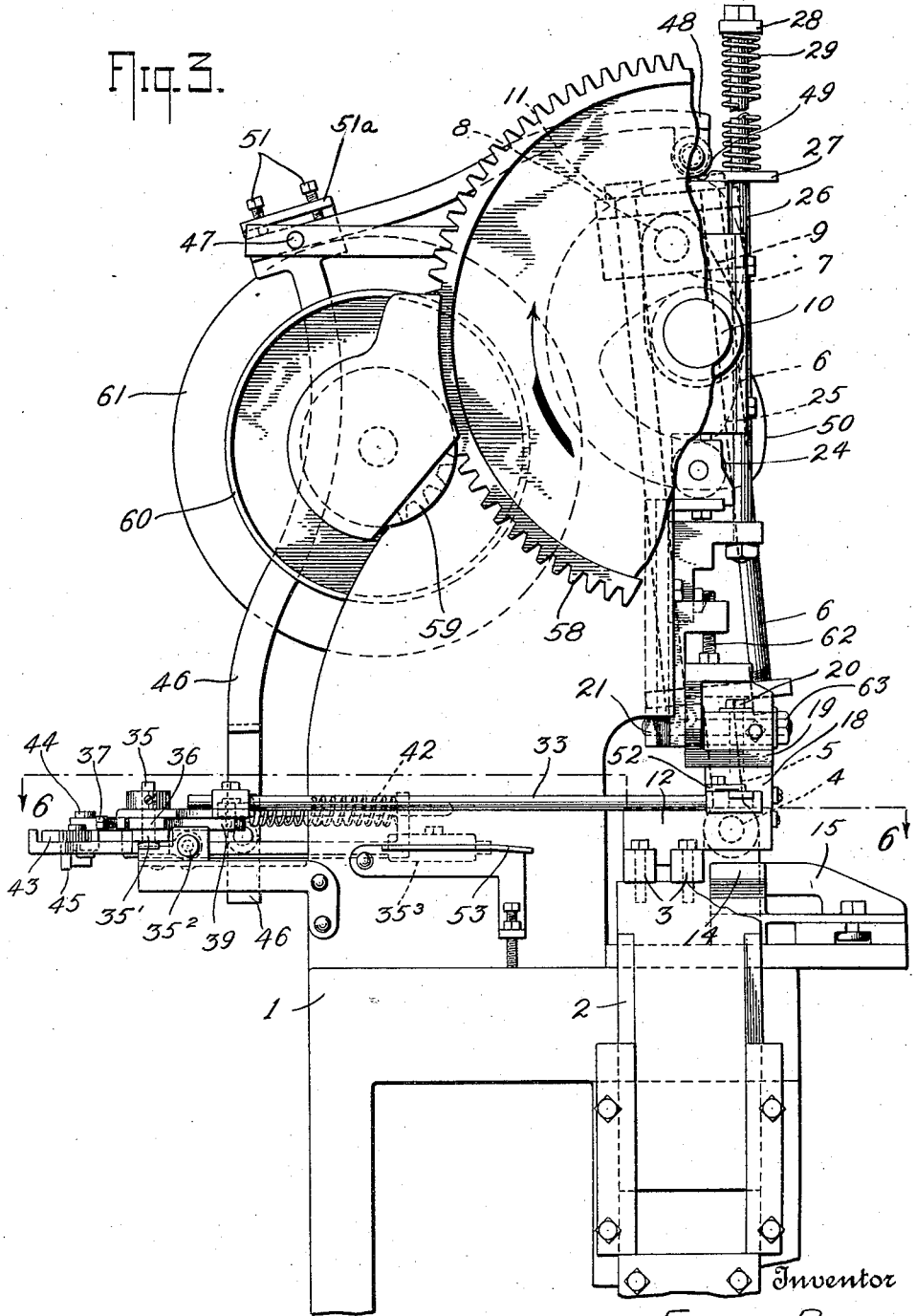
Fig. 3 is a partial left-hand end elevation of the machine as shown in Fig. 2.

Operation: The cams 25 and 50 are shaped substantially as shown in Fig. 3 and are so located relatively to the crank arms 9 that when the crank arms 9 begin to descend, the slide 21 being released by the cam 25, rises under the action of the spring 29, the heart shape cam 50 acting on the arm 48 so as to hold the fingers 34 in outward position.

As soon as the clamp is fully opened an operator places upon the supports 14 a blank such as is shown in Fig 8, previously heated to a bending heat, forcing the same back against the stops 16, 16′. The fingers 34 are then brought toward one another by the spring 42 controlled by the cam 50 and automatically adjust the blank longitudinally. As soon as that adjusting movement is completed the contact members 17 are brought down by the slide 21 so as to engage the blank and hold it firmly, and thereupon the fingers 34 are quickly retracted.

Figure 2:
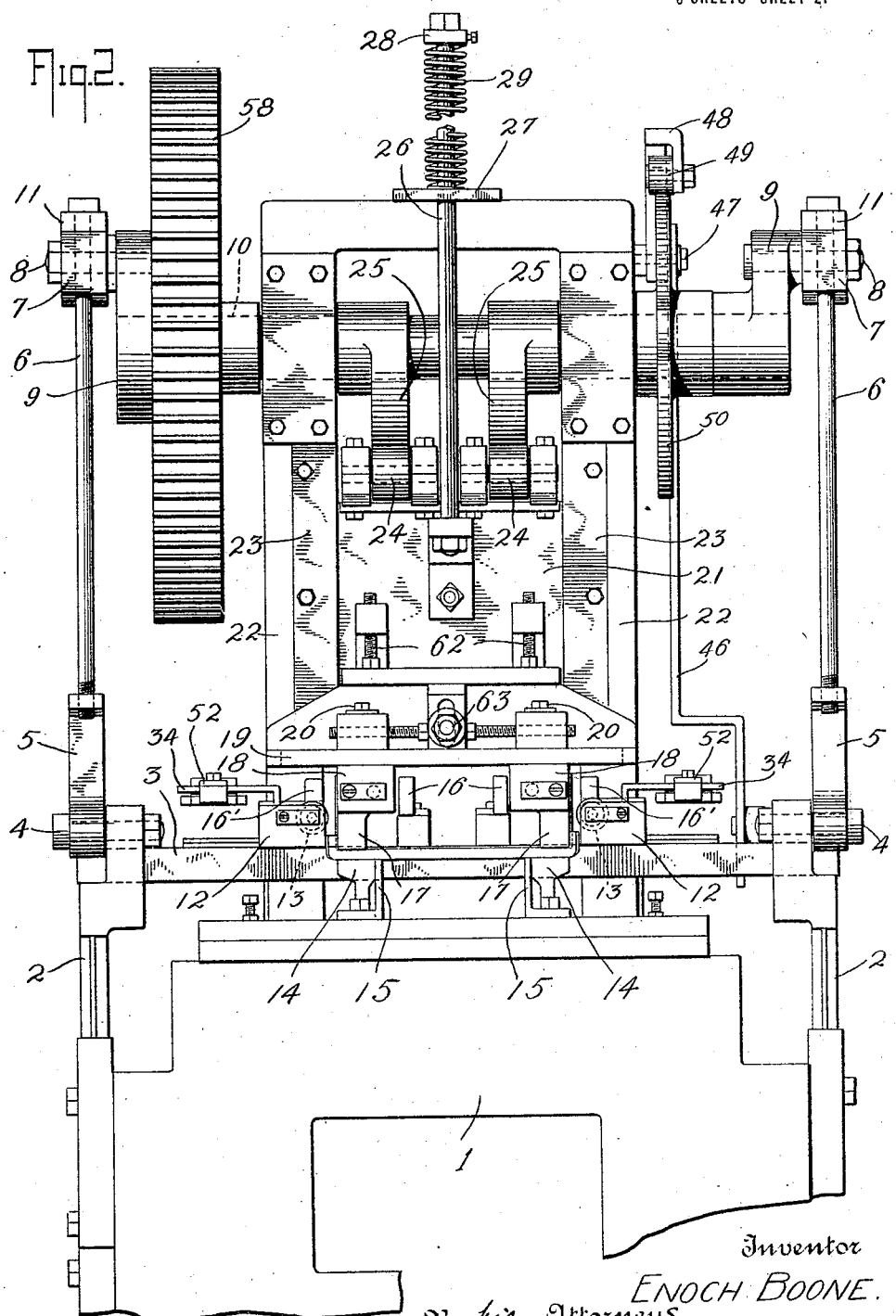
Fig. 2 is another front elevation of the machine with the parts in position corresponding to the completion of the heel forming operation.

The contact members 17 must come down only far enough to hold the blank and not far enough to compress or indent the same, and for this purpose the adjusting screws 62 are provided and also the clamping nut 63, whose bolt passes through a vertical slot in the cross-head 19. The adjustment is secured by loosening the nut 63 and turning the adjusting screws 62 in one direction or the other so as to raise or lower the crosshead 19 carrying the blocks 18—18 and the blank contacting members 17—17 pivoted thereto. After the blank has been firmly clamped in place and while it is so held, the blocks 7 rising with the crank arms 9 engage the heads 11 and lift the slides 2 upward, together with the bending blocks 12 and rollers 13, so that the rollers 13 engage the end portions of the blank and bend them up against the outer faces of the blocks 17 as shown in Fig. 2 of the drawings. Thereupon the cams 25 permit the spring 29 to raise the slide 21 which releases the heeled bar so that it can easily be removed by the operator and transferred, while still hot enough to bend, into the shoe shaping machine which forms it into the shape shown in Fig. 11. Thereafter the further movement of the cranks 9 lower the slides 2 with the bending rollers 13 to the positions shown in Fig. 1 and the parts are in position for another cycle, the fingers 34 having also been retracted and held by the cam 50. This retracting movement of the finger takes place before the slides 2 and blocks 12 perform their upward motion.

The contact members 17 clamp the blank firmly but on account of their inward swing permit the blank to be easily removed as soon as the slide 21 starts to rise.

On account of the adjustability of the blocks 12, 14 and 18 and fingers 34, the machine can be adjusted for blanks of various lengths. The adjusting screws 62 and nut 63 permit adjustments for varying thickness. The adjustment of the fingers 34 also enables the blank to be located so that one heel will be higher than the other. The adjustment of the stops 16, 16′ enables the rounding of the surfaces 56 to be varied.

As will be evident to those skilled in the art, my invention permits of various modifications without departing from the spirit thereof or the scope of the appended claims.

What I claim is:

1. In a machine for forming heels on blanks for horseshoes and the like, the combination of two clamping members having end faces adapted to engage and clamp said blanks, one of said members having side faces at right angles to said blank engaging faces, bending members adapted to be moved in a direction parallel to said side face from the horizontal plane of one clamping member toward the horizontal plane of the other and bend the end portions of a clamped blank over against said side faces, and means for operating said clamping members and said bending members.

2. In a machine for forming heels on blanks for horseshoes and the like, the combination of two clamping members having end faces adapted to engage and clamp said blanks, one of said members having side faces at right angles to said engaging faces, bending members adapted to be moved in a direction parallel to said side face from the horizontal plane of one clamping member toward the horizontal plane of the other and bend the end portions of a clamped blank over against said side faces, and means for operating said clamping members and said bending members, said bending members carrying rollers at the points where they engage the end portions of said blanks.

3. In a machine for forming heels on blanks for horseshoes and the like, the combination of two clamping members having end faces adapted to engage and clamp said blanks, one of said members having side faces at right angles to said engaging faces, bending members adapted to be moved in a direction parallel to said side face from the horizontal plane of one clamping member toward the horizontal plane of the other and bend the end portions of a clamping blank over against said side faces, and means for operating said clamping members and said bending members, said bending members carrying rollers at the points where they engage said end portions, said rollers having concave surfaces.

4. In a machine for forming heels on blanks for horseshoes and the like, the combination of two clamping members having end faces adapted to engage and clamp said blanks, one of said members having side faces at right angles to said engaging faces, bending members adapted to be moved in a direction parallel to said side face from the horizontal plane of one clamping member toward the horizontal plane of the other and bend the end portions of a clamping blank up against said side faces, means for operating said clamping members and said bending members, and automatic means for adjusting said blank lengthwise between said clamping members before said members have moved to clamping position.

5. In a machine for forming heels on blanks for horseshoes and the like, the combination of two clamping members having end faces adapted to engage and clamp said blanks, one of said members having side faces at right angles to said engaging faces, bending members adapted to be moved from one clamping member toward the other and bend the end portions of a clamping blank over against said side faces, and means for operating said clamping members and said bending members, one of said side faces being carried by a pivoted block forming part of its clamping member, said block being so pivoted that its lower end can swing inward toward the other side face when its member is moved out of blank-clamping position.

6. In a machine for forming heels on blanks for horseshoes and the like, the combination of two clamping members having end faces adapted to engage and clamp said blanks, one of said members having side faces at right angles to said engaging faces, bending members adapted to be moved from one clamping member toward the other and bend the end portions of a clamping blank over against said side faces, and means for operating said clamping members and said bending members, said side faces being inclined toward one another in a direction parallel to said engaging faces when a blank is clamped between said clamping members and the end faces thereof are parallel.

7. In a machine for forming heels on blanks for horseshoes and the like, the combination of two clamping members, one of which is provided with two contact blocks pivoted so as to swing toward one another, said contact blocks having clamping surfaces on their ends and external side surfaces at right angles thereto, said side surfaces being inclined to one another in a direction parallel to said engaging faces when a blank is clamped between said clamping members and said clamping surfaces are parallel to the same plane, means for actuating said clamping members, automatic means for positioning a blank longitudinally between said clamping members before the clamping action takes place, bending blocks adapted to move from one clamping member toward the clamping member having said pivoted blocks, and bend the ends of a clamped blank over against said side surfaces, and means for moving said bending blocks.

8. In a machine for forming heels on blanks for horseshoes and the like, the combination of two clamping members, one of which is provided with two contact blocks pivoted so as to swing toward one another, said contact blocks having clamping surfaces on their ends and external side surfaces at right angles thereto, said external side surfaces being inclined to one another in a direction parallel to said engaging faces when said clamping surfaces are positioned so as to be in the same plane, means for actuating said clamping members, automatic means for positioning a blank longitudinally between said clamping members before the clamping action takes place, bending blocks adapted to move from one clamping member toward the clamping member having said pivoted blocks, means for moving said bending blocks, said moving means comprising a shaft with an eccentric member thereon, and means connecting said eccentric member with said bending blocks, said means comprising a lost motion connection.

9. In a machine for forming heels on blanks for horseshoes and the like, the combination of two clamping members, one of which is provided with two contact blocks pivoted so as to swing toward one another, said contact blocks having clamping surfaces on their ends and external side surfaces at right angles thereto, said external surfaces being inclined to one another in a direction parallel to said engaging faces when a blank is clamped between said clamping members, means for actuating said clamping members, automatic means for positioning a blank longitudinally between said clamping members before the clamping action takes place, bending blocks adapted to move from one clamping member toward the clamping member having said pivoted blocks, means for moving said bending blocks, said bending blocks having concave rollers at the points where they engage the end portions of said blank, and adjustable guides limiting the movement of the blank transversely to its axis so as to position it relatively to the desired portion of the concave surface of said rollers.

10. In a machine for forming heels upon blanks for horseshoes and the like, the combination of two clamping members, one located above the other, the upper clamping member having at each side a movable contact block pivoted thereto and adapted to swing toward the other side, the external side faces of the contact blocks of said upper clamping member being substantially vertical when a bar is clamped between said members, bending blocks at the two sides of said lower clamping member normally located below the upper surface thereof, automatic means for adjusting a blank longitudinally upon the upper surface of said lower clamping member before said blank is clamped, and means for moving said upper clamping member downward so as to clamp the blank when longitudinally adjusted, and means for moving said bending blocks upward so as to engage the end portions of the clamped bar and bend the same up against the external side faces of said upper clamping member.

11. In a machine for forming heels upon blanks for horseshoes and the like, the combination of two clamping members, one located above the other, the upper clamping member having at each side a movable block pivoted thereto and adapted to swing toward the other side, the external side faces of the contact blocks of said upper clamping member being substantially vertical when a bar is clamped between said members, bending blocks at the two sides of said lower clamping member normally located below the upper surface thereof, automatic means for adjusting a blank longitudinally upon the upper surface of said lower clamping member, means for moving said upper clamping member downward so as to clamp the blank when longitudinally adjusted, and means for moving said bending blocks upward so as to engage the end portions of the clamped bar and bend the same up against the external side faces of said upper clamping member, said external faces being inclined toward one another when said clamping members are in clamping position.

12. In a machine for forming heels upon blanks for horseshoes and the like, the combination of two clamping members, one located above the other, the upper clamping member having at each side a movable block pivoted thereto and adapted to swing toward the other side, the external side faces of the contact blocks of said upper clamping member being substantially vertical when a bar is clamped between said members, bending blocks at the two sides of said lower clamping member normally located below the upper surface thereof, automatic means for adjusting a blank longitudinally upon the upper surface of said lower clamping member, means for moving said upper clamping member downward so as to clamp the blank when longitudinally adjusted, means for moving said bending blocks upward so as to engage the end portions of the clamped bar and bend the same up against the external side faces of said upper clamping member, said external faces being inclined toward one another when said clamps are in clamping position, said bending members having concave rollers at the points where they engage the end portions of said blank, and adjustable stops for limiting the transverse movement of said blank so as to locate it at the desired points relatively to the concave surfaces of said rollers.

ENOCH BOONE.